(12) United States Patent
Dong et al.

(10) Patent No.: US 12,367,794 B1
(45) Date of Patent: Jul. 22, 2025

(54) VIRTUAL WINDOW FOR AIRCRAFT FUSELAGE

(71) Applicant: The Boeing Company, Arlington, VA (US)

(72) Inventors: Zhongzhe Dong, Beijing (CN); Kevin Julian Chang, Arlington, VA (US); Weiqiang Liu, Beijing (CN)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/417,730

(22) Filed: Jan. 19, 2024

(51) Int. Cl.
*B64D 11/00* (2006.01)
*B64C 1/14* (2006.01)
*G09G 3/00* (2006.01)
*G06F 3/041* (2006.01)

(52) U.S. Cl.
CPC .......... *G09G 3/001* (2013.01); *B64C 1/1484* (2013.01); *B64D 11/0015* (2013.01); *B64D 2011/0061* (2013.01); *G06F 3/041* (2013.01); *G09G 2354/00* (2013.01); *G09G 2380/12* (2013.01)

(58) Field of Classification Search
CPC ..... G09G 3/001; B64C 1/1484; B64D 1/0015
See application file for complete search history.

(56) References Cited

U.S. PATENT DOCUMENTS

| | | | |
|---|---|---|---|
| 7,782,519 B2 | 8/2010 | Weidner | |
| 9,864,559 B2 | 1/2018 | Sizelove | |
| 10,633,095 B2 | 4/2020 | Asao et al. | |
| 10,712,989 B2 | 7/2020 | Riedel et al. | |
| 10,854,002 B2 | 12/2020 | Nasi et al. | |
| 10,981,652 B2 | 4/2021 | Hahn et al. | |
| 11,158,220 B2 | 10/2021 | Garnier et al. | |
| 11,390,370 B2 | 7/2022 | Spencer et al. | |
| 2012/0212613 A1* | 8/2012 | Yamaguchi | B60R 1/25 348/148 |
| 2015/0170604 A1 | 6/2015 | Iwagaki et al. | |
| 2018/0352196 A1* | 12/2018 | Marin-Martinod | H04N 7/181 |
| 2021/0276715 A1 | 9/2021 | Shetgar et al. | |
| 2024/0198908 A1* | 6/2024 | Shintani | H04N 9/3188 |

FOREIGN PATENT DOCUMENTS

| | | |
|---|---|---|
| CN | 114228973 A | 3/2022 |
| EP | 3683145 A1 | 7/2020 |
| FR | 2999148 A1 | 6/2014 |
| JP | 2000350195 A | 12/2000 |
| KR | 102407318 B1 | 6/2022 |

OTHER PUBLICATIONS

European Patent Office Extended Search Report, dated May 20, 2025, regarding Application No. EP25150353.8, 8 pages.

* cited by examiner

*Primary Examiner* — Roy P Rabindranath
(74) *Attorney, Agent, or Firm* — Yee & Associates, P.C.

(57) ABSTRACT

A projection based virtual window system of an aircraft includes a hull, a transparent lens, a projection system, and a controller. The hull is mounted to an interior wall of a passenger cabin of the aircraft. The hull is positioned over a hole in the interior wall. The transparent lens is secured between the hull and the interior wall and includes a touch sensing layer embedded within. The projection system displays an image on a projection surface of the hull. The controller receives instructions from the touch sensing layer and is further operable to provide the image to the projection system.

20 Claims, 9 Drawing Sheets

VIRTUAL WINDOW FOR AIRCRAFT FUSELAGE

BACKGROUND INFORMATION

1. Field

The present disclosure relates generally to aircraft windows. More specifically, the present disclosure relates to a projection based virtual window for commercial aircraft fuselage structures.

2. Background

With the growing proliferation of composite materials used in the fabrication of aircraft fuselage structures and the desire for aircraft fabrication to be faster and less expensive, the inherent physical attributes of traditional physical windows have presented challenges.

Physical windows occupy holes cut in the fuselage structure of an aircraft and allow occupants of the aircraft to visually see through the window to the outside of the aircraft. Forming the holes for windows in the fuselage structure during fabrication is time consuming and adds expense. Additionally, holes in the fuselage structure compromise structural integrity of the fuselage and thus require additional costly, time consuming, and weight increasing strengthening materials to be added. The windows are typically made of a transparent material and are permanently mounted to the fuselage of the aircraft. Physical windows need to be strengthened with additional material to avoid structure fatigue failures. The weight to an aircraft for each window can vary widely depending on the size of the window and type of aircraft, with larger windows in widebody aircraft being heavy. As it is customary for each row of seats to be aligned with a window, traditional physical windows cannot accommodate different seat layouts because of their fixed location.

Therefore, it would be desirable to have a method and apparatus that takes into account at least some of the issues discussed above, as well as other possible issues.

SUMMARY

An illustrative example of the present disclosure provides a virtual window for an aircraft comprising an interior wall of the aircraft, a hull, a transparent lens, and a projector. The hull is mounted to the interior wall of the aircraft. The transparent lens is secured between the hull and the interior wall. The projector is positioned between the transparent lens and the hull. Further, the projector is configured to display an image on the hull.

Another illustrative example of the present disclosure provides a projection based virtual window system of an aircraft comprising a hull, a transparent lens, a projection system, a projection surface of the hull, and a controller. The hull is mounted to an interior wall of a passenger cabin of the aircraft. The hull is positioned over a hole in the interior wall. The transparent lens is secured between the hull and the interior wall. The projection system is configured to display an image on the projection surface of the hull. The controller is operable to provide the image to the projection system.

A further illustrative example of the present disclosure provides a method for projecting a virtual window of an aircraft. The method includes a step of mounting a virtual window system to an interior wall of the aircraft. The virtual window system is positioned over a hole in the interior wall. The virtual window system includes a transparent lens secured to a hull, a projection system connected to the hull and positioned between the transparent lens and the hull, and a touch sensing layer embedded within the transparent lens. The method includes another step of providing an image from a controller in a computer system of the aircraft to the projection system. The method further includes projecting the image on a projection surface of the hull, wherein the image is viewable through the hole in the interior wall and the transparent lens.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

The illustrative examples recognize and take into account one or more different considerations. For example, the illustrative examples recognize and take into account that during fabrication of aircraft fuselage structures, openings are required to be cut in the exterior skin to accommodate traditional physical windows.

The illustrative examples recognize and take into account that traditional physical windows are fixed in place because of the openings in the skin of the aircraft and thus cannot accommodate alternate designs or seating arrangements within a passenger cabin of an aircraft.

The illustrative examples recognize and take into account that incorporating traditional windows during fabrication of aircraft fuselage structures, the structural integrity of the fuselage structure is compromised and requires extra strengthening which is costly, time consuming, and adds weight to the aircraft.

Thus, the illustrative examples provide a projection based virtual window system. An illustrative example of a virtual window system is designed as a plug and play unit which replaces traditional windows or can be incorporated at initial fabrication. Benefits of the illustrative examples include a weight reduction of the aircraft without traditional glass windows and simplification of production by eliminating cutting window openings, especially in composite airframes due to complexities of post-production. A windowless airframe also improves fuselage strength, for example, in the wing body join section to allow for improved performance in wing design and aero performance.

Figure 1:
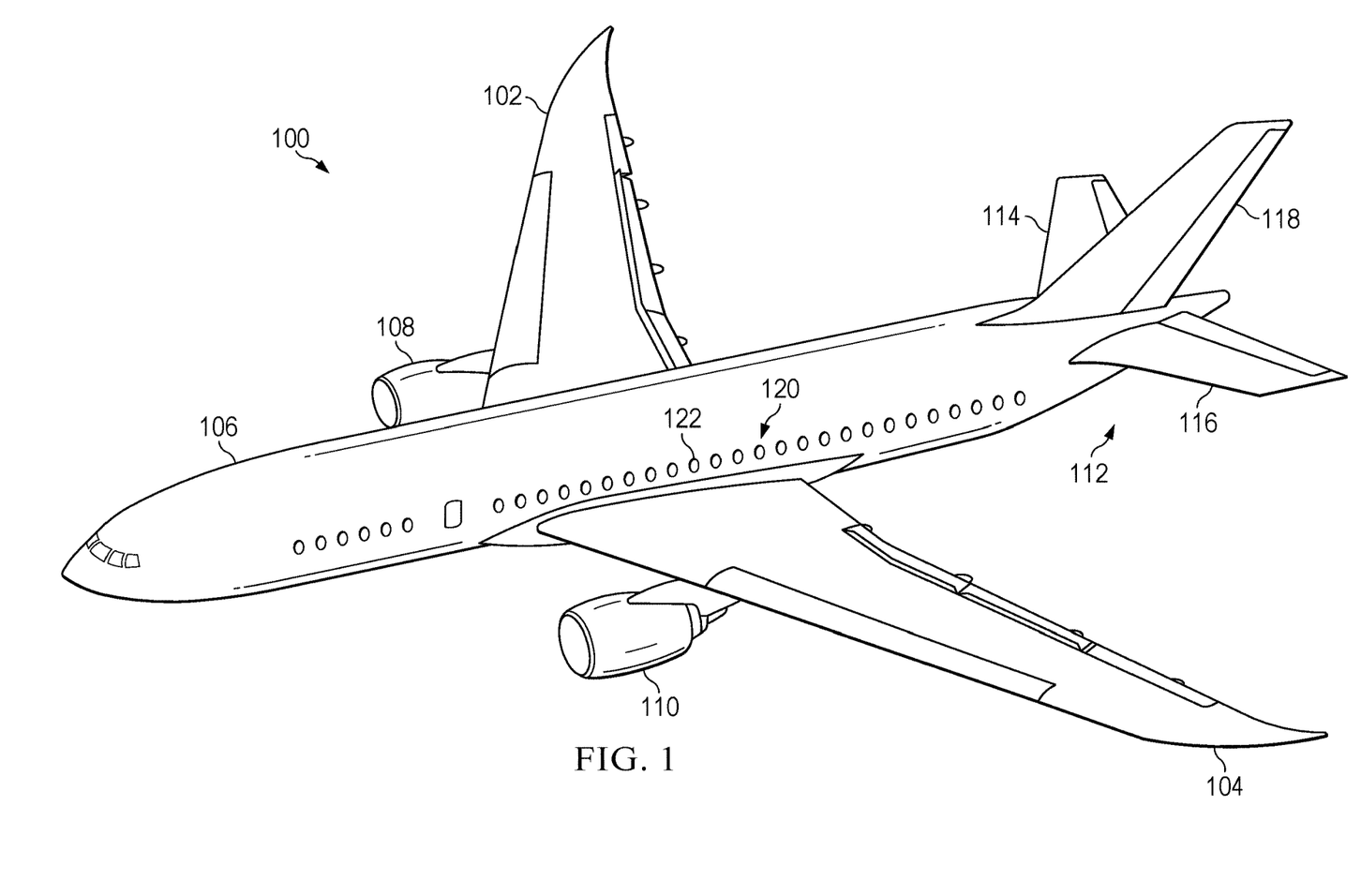
FIG. 1 is an illustration of an aircraft in accordance with an illustrative example.

With reference now to the figures, and in particular, with reference to FIG. 1, an illustration of an aircraft is depicted in accordance with an illustrative example. In this illustrative example, aircraft 100 has wing 102 and wing 104 attached to fuselage 106. Aircraft 100 includes engine 108 attached to wing 102 and engine 110 attached to wing 104.

Fuselage 106 has tail section 112. Horizontal stabilizer 114, horizontal stabilizer 116, and vertical stabilizer 118 are attached to tail section 112 of fuselage 106.

Aircraft 100 is an example of an aircraft with traditional physical windows. Set of windows 120 includes window 122. Window 122 is a traditional physical window. Window 122 is permanently mounted to fuselage 106 in a opening formed in fuselage 106. A projection based virtual window, as disclosed herein, may be retrofitted to fuselage 106 in place of window 122 or aircraft 100 including fuselage 106 may be fabricated from the start without openings cut in fuselage 106 and instead fabricated with a plurality of projection based virtual windows. A fuselage fabricated without openings for traditional windows is more structurally sound, easier and faster to produce, and less expensive to manufacture.

As used herein, a "set of," when used with reference to items, means one or more items. For example, a "set of windows" is one or more of windows.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The illustration of aircraft 100 in FIG. 1 is not meant to imply physical or architectural limitations to the manner in which an illustrative example may be implemented. For example, although aircraft 100 is a commercial aircraft, aircraft 100 may be a military aircraft, a rotorcraft, a helicopter, an unmanned aerial vehicle, or any other suitable aircraft.

Although the illustrative examples are described with respect to an aircraft, the illustrative examples may be applied to other types of platforms. The platform may be, for example, a mobile platform, a stationary platform, a land-based structure, an aquatic-based structure, or a space-based structure. More specifically, the platform may be an aircraft, a surface ship, a tank, a personnel carrier, a train, a spacecraft, a space station, a satellite, a submarine, an automobile, a power plant, a bridge, a dam, a house, a manufacturing facility, a building, a tool, a mechanical structure, or some other suitable platform or structure where installation of a projection based virtual window is desirable.

Figure 2:
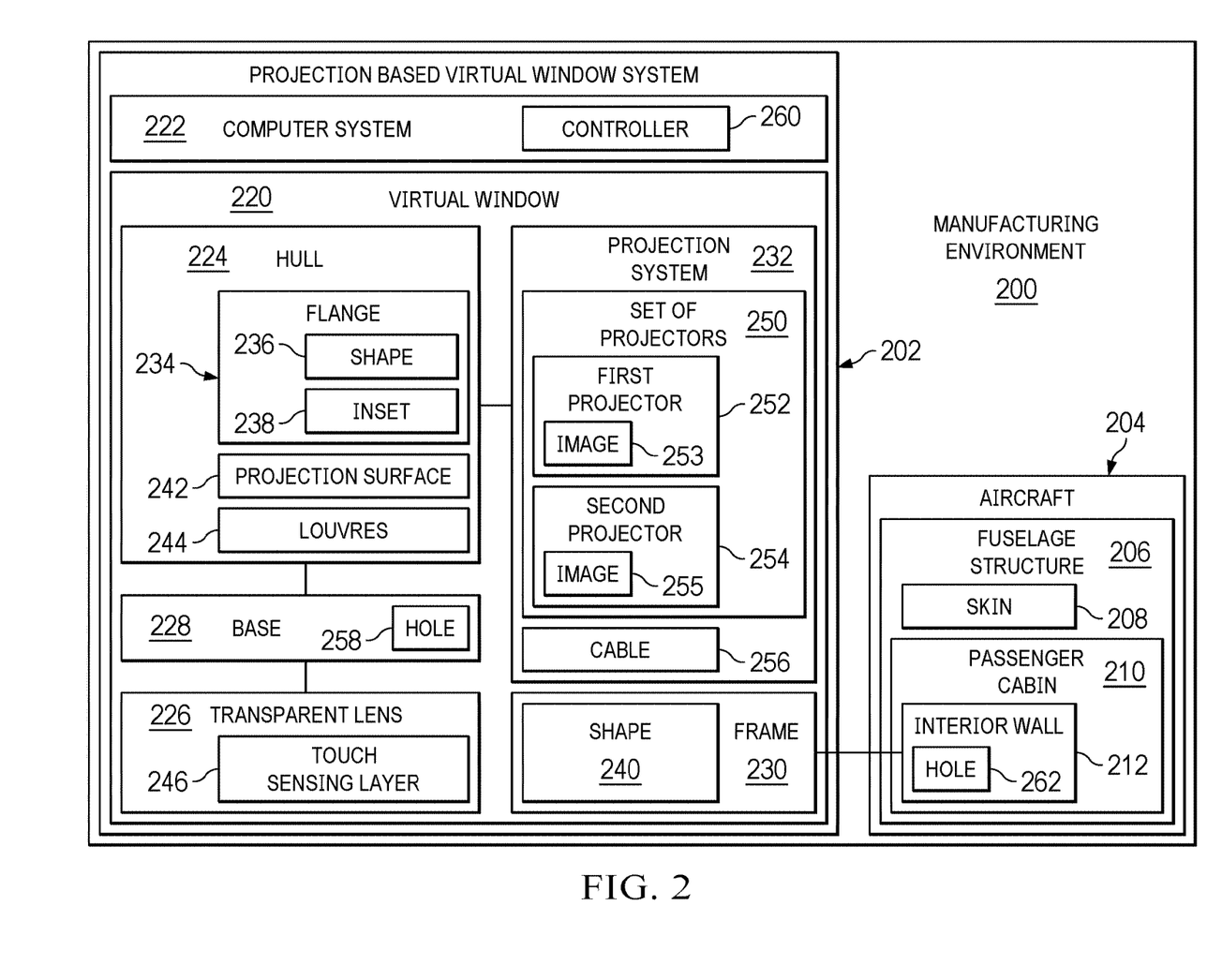
FIG. 2 is an illustration of a block diagram of a manufacturing environment in accordance with an illustrative example.
Figure 3:
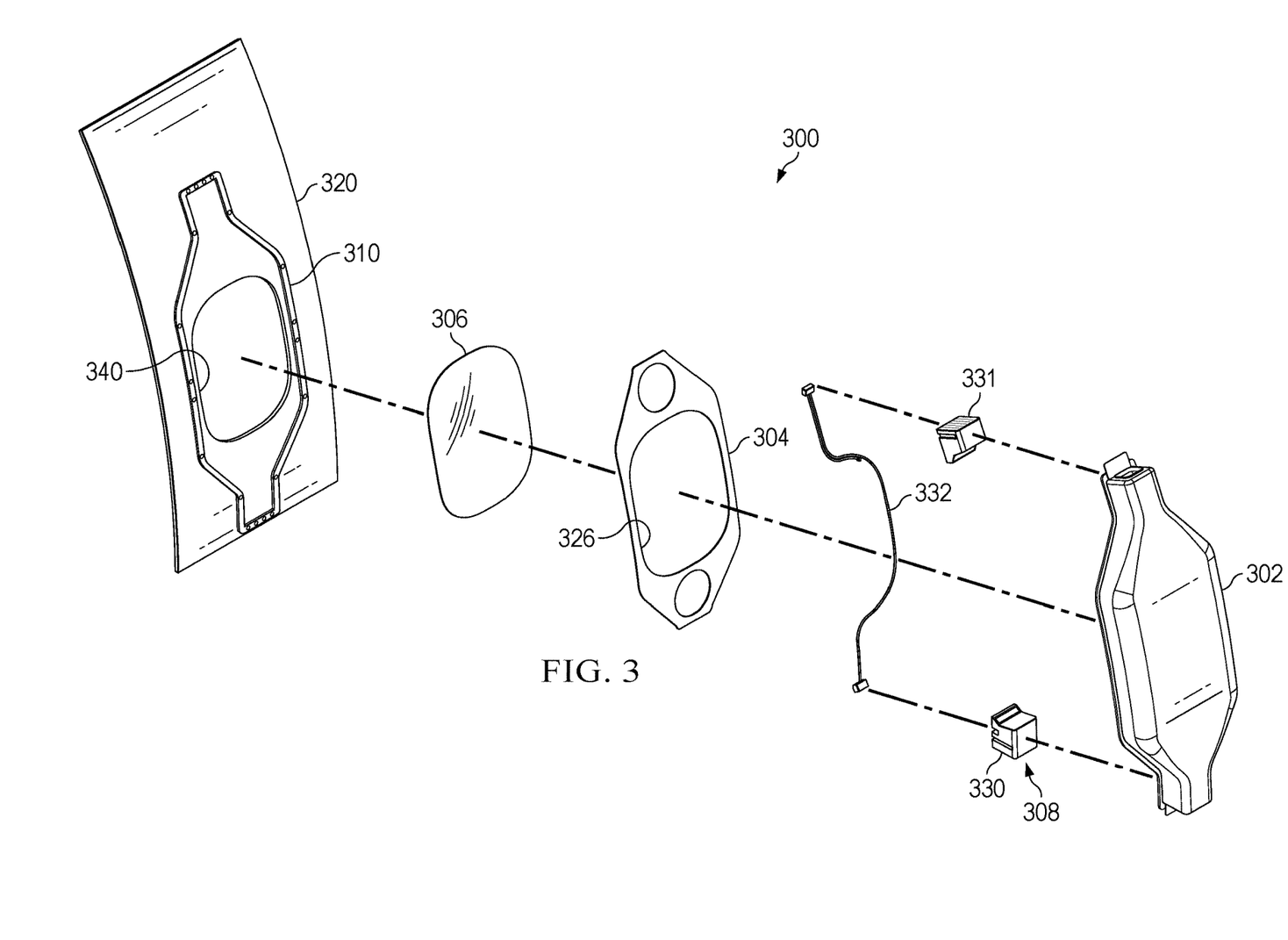
FIG. 3 is an illustration of an exploded view of a virtual window in accordance with an illustrative example.
Figure 4:
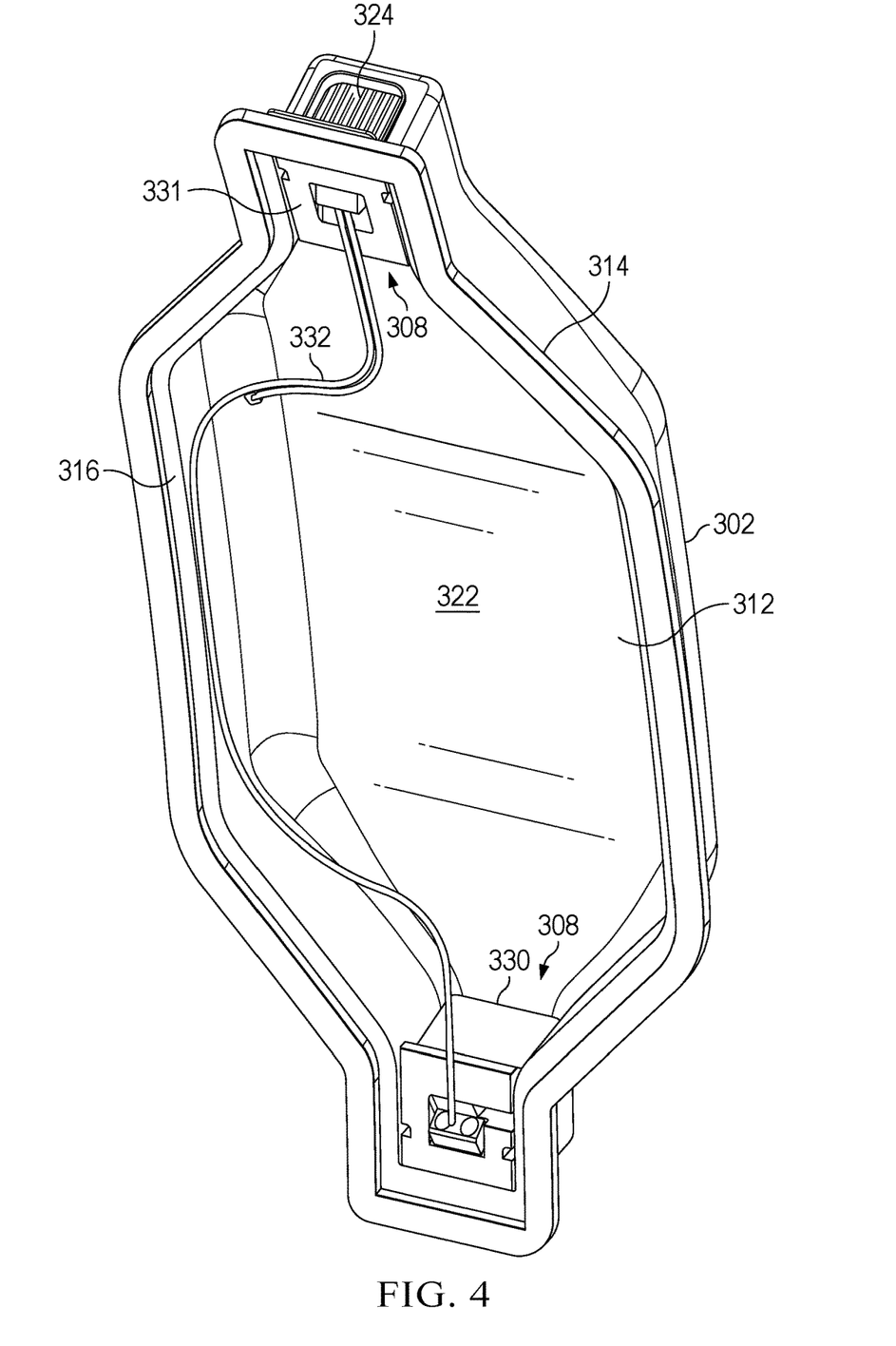
FIG. 4 is an illustration of a virtual window in accordance with an illustrative example.
Figure 5:
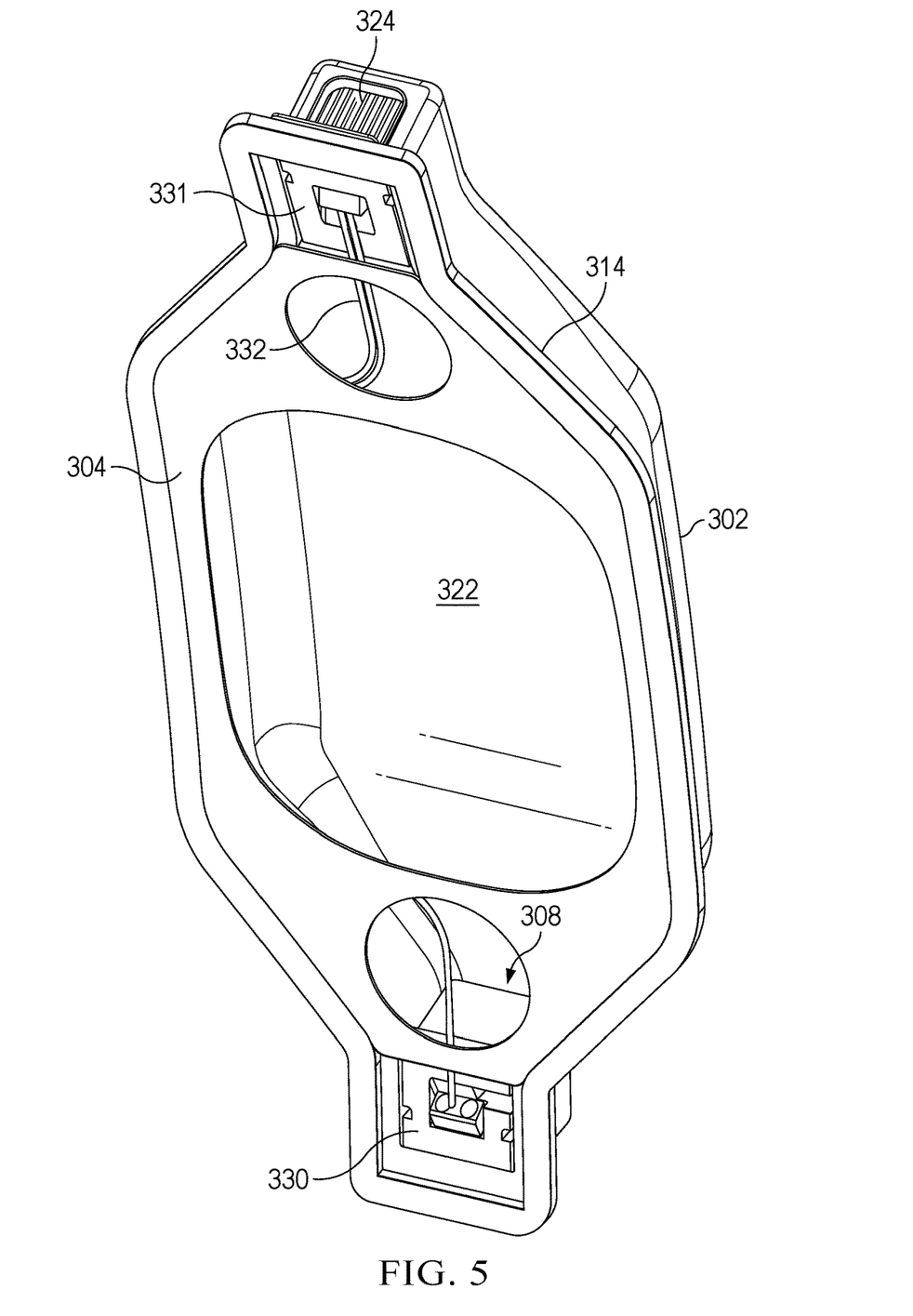
FIG. 5 is an illustration of a virtual window in accordance with an illustrative example.
Figure 6:
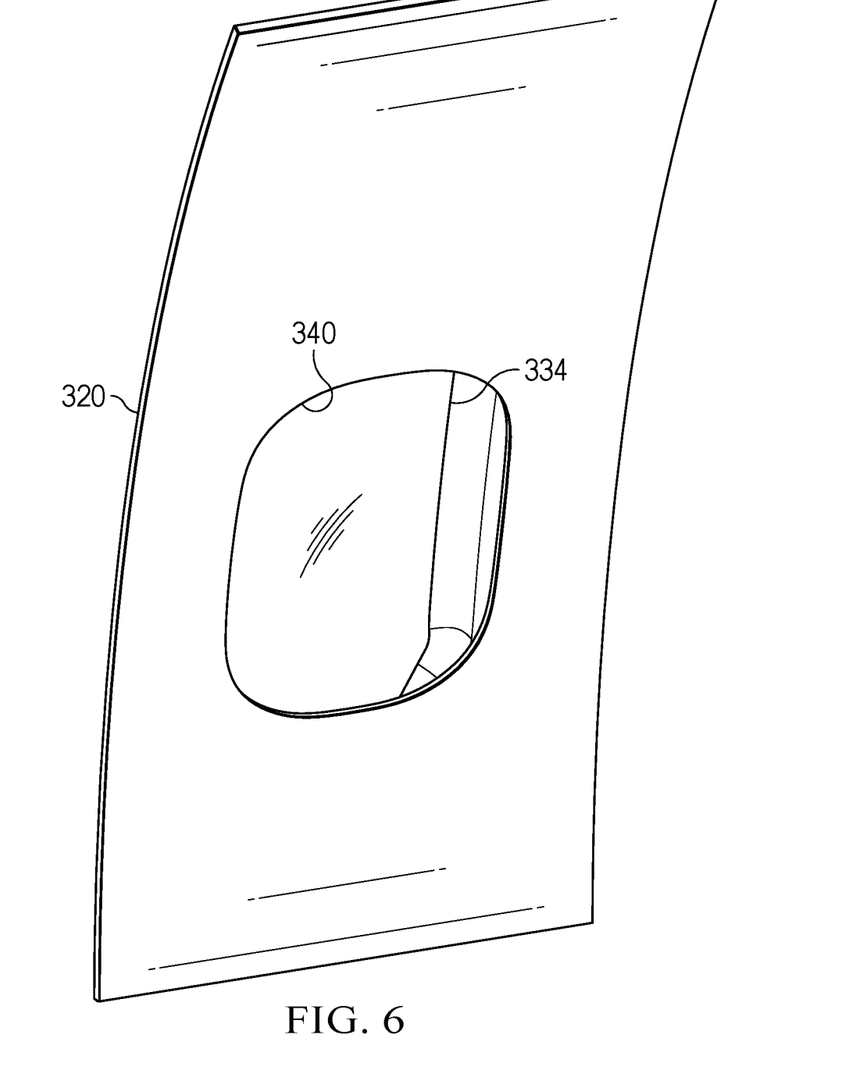
FIG. 6 is an illustration of a virtual window in accordance with an illustrative example.
Figure 7:
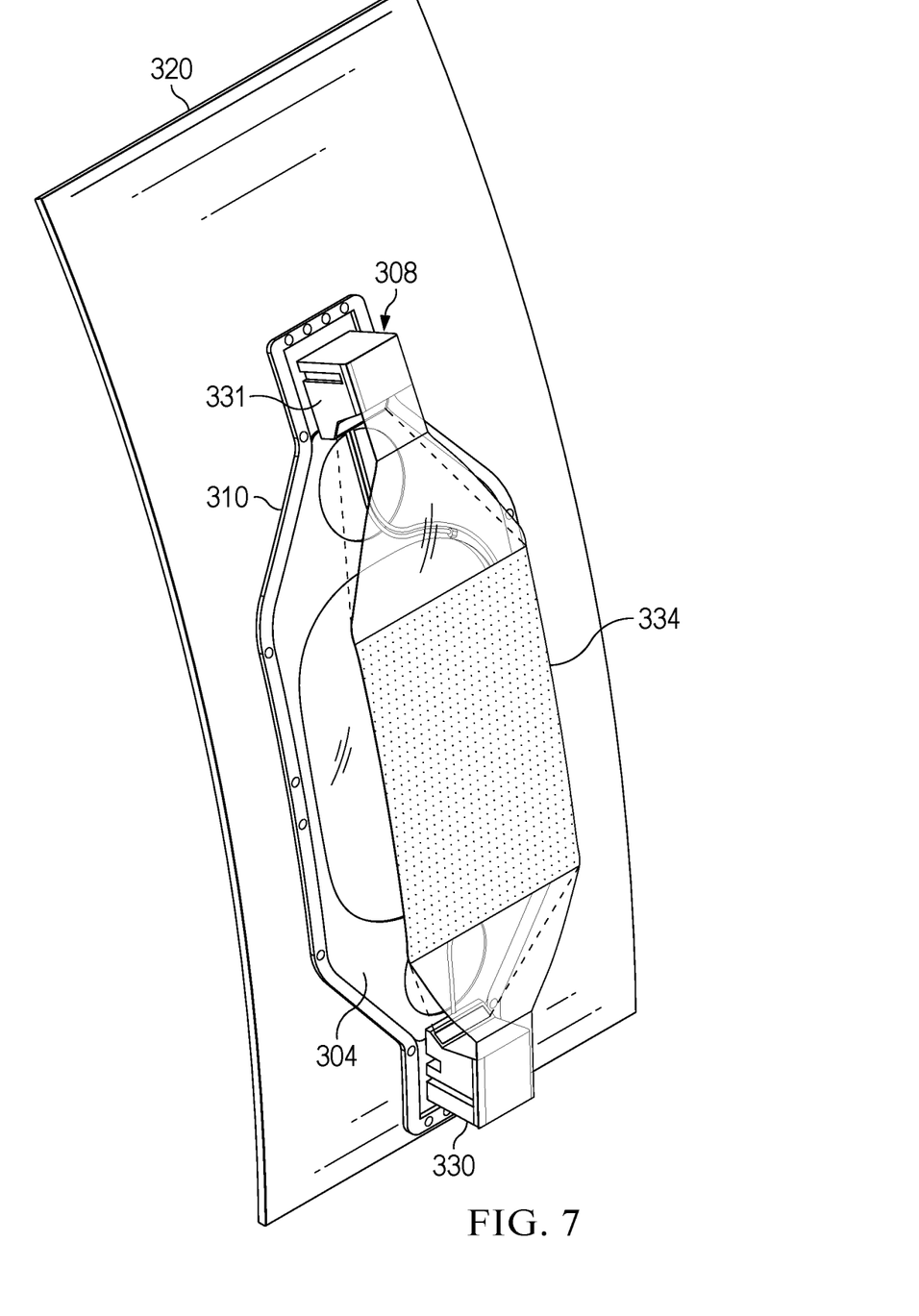
FIG. 7 is an illustration of a virtual window in accordance with an illustrative example.

Turning now to FIG. 2, an illustration of a block diagram of an aircraft manufacturing environment is depicted in accordance with an illustrative example. Aircraft manufacturing environment 200 includes projection based virtual window system 202 and aircraft 204.

In this illustrative example, aircraft 204 includes fuselage structure 206. Fuselage structure 206 has skin 208. Skin 208 is devoid of any openings that would traditionally be cut and sized for installation of traditional windows. Fuselage structure 206 defines passenger cabin 210. Passenger cabin 210 is the area of aircraft 204 where passengers sit in rows of seats during the duration of a flight of aircraft 204. Passenger cabin 210 includes interior wall 212. Interior wall includes hole 262. Interior wall 212 is exposed to the passengers sitting in passenger cabin 210. A virtual window connected to interior wall 212 will be visible to passengers sitting in passenger cabin 210 through hole 262. Passengers sitting in passenger cabin 210 will be able to interact with a virtual window connected to interior wall 212 via hole 262. Interior wall 212 is spaced from skin 208. Structural framework including but not limited to frames, beams, and stringers are present in the space between interior wall 212 and skin 208.

In this illustrative example, projection based virtual window system 202 includes virtual window 220 and computer system 222.

In this illustrative example, virtual window 220 includes hull 224, transparent lens 226, base 228, frame 230, and projection system 232.

Hull 224 is generally a hollow shell shape. Hull defines a volume having at least one open side. Arranged on the perimeter of the open side is flange 234. Flange 234 defines the perimeter having shape 236. Flange 234 includes inset 238. Flange 234 is shaped and sized to engage frame 230. Frame 230 defines shape 240. Shape 240 matches shape 236.

Hull 224 includes projection surface 242.

Projection surface 242 is positioned on an interior surface of hull 224. Projection surface 242 is on an interior surface opposite the open side of the volume defined by hull 224. Projection surface 242 may just be the interior surface of hull 224, a layer of projection paint applied to an interior surface of hull 224, multiple optical layers coated on a flexible thin substrate adhered to an interior surface of hull 224, etc. As a non-limiting example, projection paint/coatings from Smarter Surfaces are available. Further, as a non-limiting example, ultra-thin flexible Fresnel screens manufactured by Formovie are available. Characteristics of projection surface 242 increase image quality, brightness, contrast, etc. of projection based virtual window system 202.

Hull 224 may include louvres 244. Louvres 244 provide a pathway for airflow between the interior space of hull 224 and the space exterior to hull 224. The airflow pathway provided by louvres 244 may be necessary to dissipate any unwanted heat generated by projectors of projection based virtual window system 202.

Transparent lens 226 is connected to base 228. Base 228 holds transparent lens 226 in hole 258 formed in base 228. Hole 258 is sized to securely hold transparent lens 226 relative to base 228. Base 228 holds transparent lens 226 relative to hull 224 as base 228 is connected to hull 224 at inset 238. Transparent lens 226 includes touch sensing layer 246. Touch sensing layer 246 may be embedded within transparent lens 226. Touch sensing layer 246 may be a laminate layer adhered to transparent lens 226. Examples of touch sensing layer 246 or a touchscreen such as duraTOUCH® manufactured by UICO® are widely available. Transparent lens 226 may include an electrochromic layer integrated with transparent lens 226 or adhered to transparent lens 226. The electrochromic layer can create a window blinds effect, where in the case virtual window 220 was retrofitted to a fuselage structure already having an opening for a traditional window, the electrochromic layer can shield the interior of the aircraft from the sun when the system is off. Hull 224 or transparent lens 226 or both may include one or more tiny pin holes, which during operation of the aircraft, operate to alleviate pressure differences between the interior of the aircraft and the space virtual window 220 is installed in.

Projection system 232 includes set of projectors 250. Set of projectors 250 includes at least one projector but may include first projector 252 and second projector 254. First projector 252 projects image 253 onto projection surface 242. Second projector 254 projects image 255 onto projection surface 242. Image 253 and image 255 may be the same image. Image 253 and image 255 may be different images where one is overlayed on the other or they are projected side-by-side on projection surface 242. When image 253 and image 255 are the same image, one may provide redundancy for the other in case of failure. When more than one projector is present, cable 256 connects first projector 252 to second projector 254. Cable 256 may also provide a communication link between the projectors and controller 260. Image 253 and/or image 255 may show a view from an exterior camera to imitate the view of a traditional window to passengers within the passenger cabin. First projector 252 and second projector 254 may be considered "micro" or "ultra-short throw" projectors. First projector 252 and second projector 254 may have a throw ratio of approximately 0.250-0.270 (distance/width). Due to a limited projection distance between each projector and a projection surface of virtual window 220, an ultra-short throw optical engine projector is preferred. As a non-limiting example, projectors with ultra-short throw optical engines manufactured by Ongine are available.

In this illustrative example, operation of projection based virtual window system 202 can be controlled by controller 260 in computer system 222.

Controller 260 can be implemented in software, hardware, firmware, or a combination thereof. When software is used, the operations performed by controller 260 can be implemented in program code configured to run on hardware, such as a processor unit. When firmware is used, the operations performed by controller 260 can be implemented in program code and data and stored in persistent memory to run on a processor unit. When hardware is employed, the hardware can include circuits that operate to perform the operations in controller 260.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 222 is a physical hardware system and includes one or more data processing systems. When more than one data processing system is present in computer system 222, those data processing systems are in communication with each other using a communications medium. The communications medium can be a network. The data processing systems can be selected from at least one of a computer, a server computer, a tablet computer, or some other suitable data processing system.

In the illustrative example, controller 260 can control projection system 232 to project image 253 and/or image 255 onto projection surface 242. Additionally, controller 260 can receive inputs from touch sensing layer 246 to change image 253 or image 255. Passengers interacting with touch sensing layer 246 create signals sent from touch sensing layer 246 and received by computer system 222. Controller 260 controls what images are projected by projection system 232 based on inputs received from passengers and from messages and images programmed in computer system 222. Controller 260 operates to provide images to projection system 232.

In use, frame 230 is connected to interior wall 212 of aircraft 204 surrounding hole 262. Projection system 232 including first projector 252 and/or second projector 254 is connected to hull 224. Projection system 232 is in communication with computer system 222 and controller 260. The communication between projection system 232 and computer system 222 can be hard wired or can be wireless. Transparent lens 226 is connected to base 228. Base 228 is connected to hull 224 at inset 238. Hull 224 is connected to frame 230 such that hole 258 of base 228 and transparent lens 226 mounted therein is aligned with hole 262 of interior wall 212.

Virtual window 220 comprising hull 224, base 228, transparent lens 226, and projection system 232 is assembled as a plug-and-play unit that can be interchangeably mounted to an interior wall of an aircraft's passenger cabin using frame 230. Virtual window 220 may be connected to frame 230 with conventional fasteners or virtual window 220 may be connected to frame 230 with a friction fit with a snap on type structure.

As used herein, a first component "connected to" or "coupled to" or "associated with" a second component means that the first component can be connected directly or indirectly to the second component. The connection is a physical association. In other words, additional components may be present between the first component and the second component. The first component is considered to be indirectly connected to the second component when one or more additional components are present between the two components. When the first component is directly connected to the second component, no additional components are present between the two components.

For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

With reference next to FIGS. 3-7, illustrations of a projection based virtual window system are depicted in accordance with an illustrative example. In this illustrative example and the illustrative examples that follow, the same reference numeral may be used in more than one figure. This reuse of a reference numeral in different figures represents the same element in the different figures. The components illustrated in FIGS. 3-7 are examples of physical implementations of virtual window 220 shown in block form in FIG. 2.

As illustrated, virtual window 300 includes hull 302, base 304, transparent lens 306, projection system 308, and frame 310.

Hull 302 defines a volume having at least one open side 312. Arranged on the perimeter of open side 312 is flange 314. Flange 314 includes inset 316. Flange 314 is shaped and sized to engage frame 310 mounted to interior wall 320.

Hull 302 includes projection surface 322. Projection surface 322 is positioned on an interior surface of hull 302. Projection surface 322 is opposite open side 312. Hull 302 includes louvres 324. Louvres 324 provide a pathway for airflow between the interior of hull 302 and space exterior to hull 302.

Transparent lens 306 is connected to base 304. Base 304 securely holds transparent lens 306 in hole 326 formed in base 304. Transparent lens 306 includes a touch sensing layer. The touch sensing layer may be embedded within transparent lens 306 or it may be a laminate layer adhered to transparent lens 306. Transparent lens 306 may also include an electrochromic layer.

Projection system 308 includes first projector 330 and second projector 331. First projector 330 projects image 334 onto projection surface 322. Second projector 331 may project image 334 onto projection surface 322 as well or may project a different image. Images projected by each projector work together to provide images and messages to passengers within the passenger cabin. Cable 332 connects first projector 330 to second projector 331.

Frame 310 is connected to interior wall 320 surrounding hole 340 formed in interior wall 320. Projection system 308 including first projector 330 and second projector 331 is connected to hull 302. Transparent lens 306 is connected to base 304 in hole 326 formed in base 304. Base 304 is connected to hull 302 at inset 316. Hull 302 is connected to frame 310 such that hole 326 of base 304 and transparent lens 306 mounted therein is aligned with hole 340 of interior wall 320. Hole 262 is aligned with transparent lens 306 such that image 334 can be viewed through hole 262 and transparent lens 306 from the passenger cabin of the aircraft.

Virtual window 300 including hull 302, base 304, transparent lens 306, and projection system 308 is assembled as a plug-and-play unit that can be interchangeably mounted at desired locations to interior wall 320 using frame 310. Virtual window 300 may be connected to frame 310 with conventional fasteners or virtual window 300 may be connected to frame 310 with a friction fit.

Figure 8:
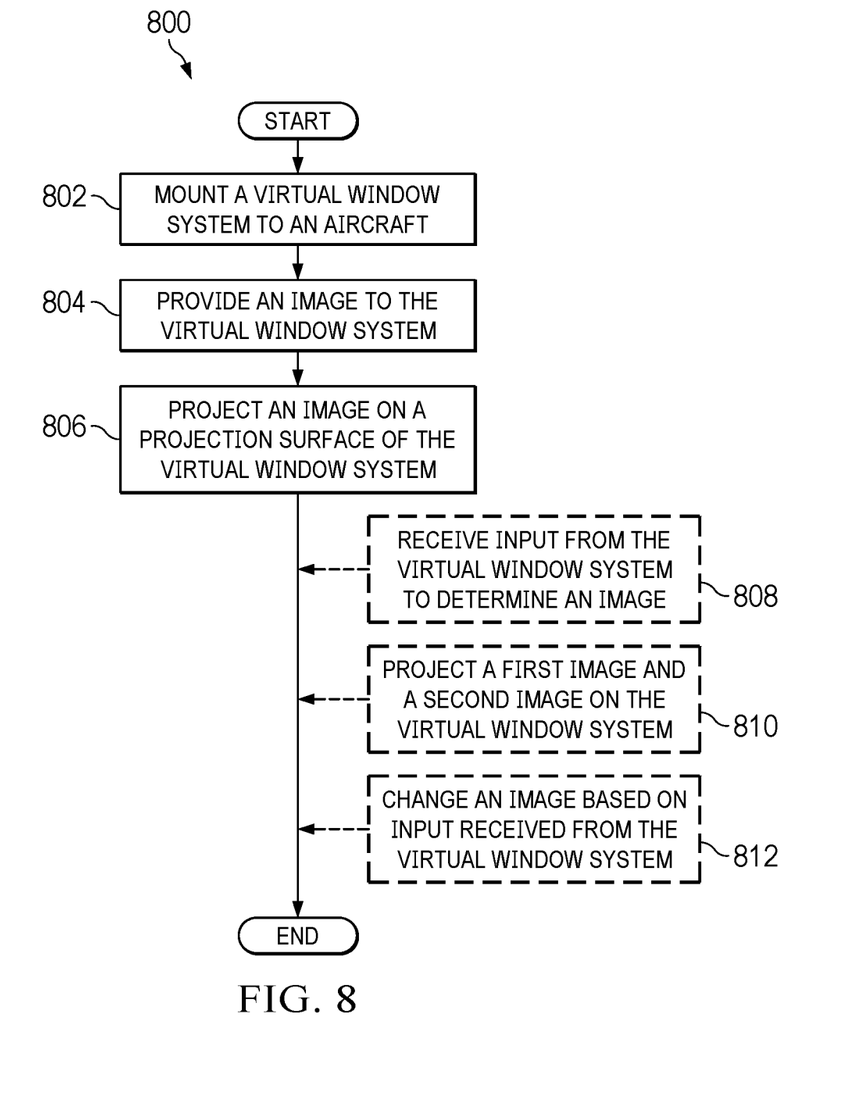
FIG. 8 is an illustration of a flowchart of a process for projecting a virtual window of an aircraft in accordance with an illustrative example.

With reference next to FIG. 8, an illustration of a flowchart of a process 800 for projecting a virtual window is depicted in accordance with an illustrative example. The method depicted in FIG. 8 may be used in conjunction with projection based virtual window system 202 depicted in FIGS. 1-7.

The process begins by mounting a virtual window system to an interior wall of an aircraft (operation 802). The virtual window system is positioned over a hole in the interior wall. The virtual window system includes a transparent lens secured to a hull, a projection system connected to the hull and positioned between the transparent lens and the hull, and a touch sensing layer embedded within the transparent lens. The process provides an image from a controller in a computer system of the aircraft to the projection system (operation 804). The process then projects the image on a projection surface of the hull (operation 806). The image is viewable through the hole in the interior wall and viewable through the transparent lens. The process may receive input from the virtual window to determine the image projected (operation 808). At operation 810, the process may project both a first image and a second image on a projection surface of the hull. The process may change the image to be projected based on input received from the touch sensing layer of the transparent lens (operation 812). Passengers in the passenger cabin can interact with the touch sensing layer of the transparent lens to provide input to the virtual window system and determine what the image to be projected will be.

In some alternative implementations of an illustrative example, the function or functions noted in the blocks may occur out of the order noted in the Figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 9:
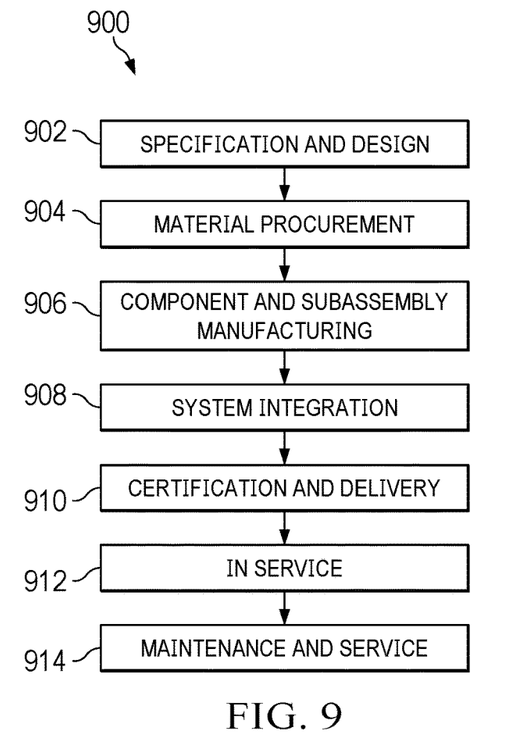
FIG. 9 is an illustration of a block diagram of an aircraft manufacturing and service method in accordance with an illustrative example.
Figure 10:
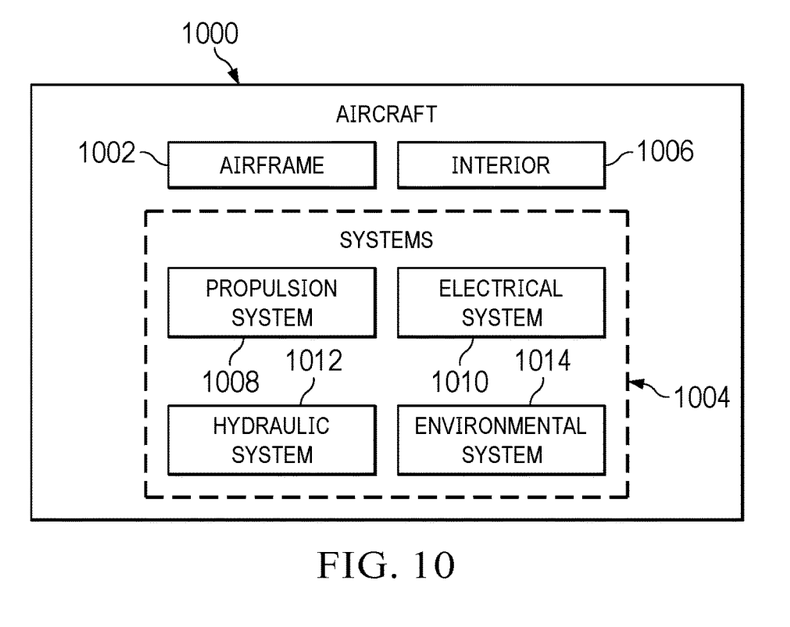
FIG. 10 is an illustration of a block diagram of an aircraft in which an illustrative example may be implemented.

The illustrative embodiments of the disclosure may be further described in the context of aircraft manufacturing and service method 900 as shown in FIG. 9 and aircraft 1000 as shown in FIG. 10. Turning first to FIG. 9, an illustration of a block diagram of an aircraft manufacturing and service method is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 may go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance, service, or inspection.

The apparatus of this disclosure may be installed on an aircraft during component and subassembly manufacturing 906. In addition, the apparatus of this disclosure may be retrofitted onto aircraft 1000 in FIG. 10 during routine maintenance and service 914 as part of a modification, reconfiguration, or refurbishment of aircraft 1000 in FIG. 10.

Each of the processes of aircraft manufacturing and service method 900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 10, an illustration of a block diagram of an aircraft is depicted in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9. In one illustrative example, components or subassemblies produced in component and subassembly manufacturing 906 in FIG. 9 may be fabricated or manufactured in a manner similar to components or subassemblies produced while aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9. One or more apparatus embodiments, method embodiments, or a combination thereof may be utilized while aircraft 1000 is in service 912, during maintenance and service 914 in FIG. 9, or both. The use of a number of the different illustrative embodiments may substantially expedite the assembly of aircraft 1000, reduce the cost of aircraft 1000, or both expedite the assembly of aircraft 1000 and reduce the cost of aircraft 1000.

The disclosed virtual window system is designed to replace physical windows with digital features. The disclosed virtual window system eliminates heavy and high-cost physical windows. Physical windows need to be strengthened with more material to avoid structure fatigue failures. The disclosed virtual window system provides a digital display for enhanced passenger experience. In-flight Information can be shared to passengers via the display. The disclosed virtual window system can accommodate different seat layouts because they are not confined to a fixed location predetermined by cutouts in the fuselage structure. The disclosed system is infinitely variable.

The disclosed virtual window system provides weight savings of approximately 70% weight saving per window. The disclosed virtual window system reduces fuselage production time and effort. The disclosed virtual window system is a plug and play unit allowing for different cabin configurations.

The description of the different illustrative examples has been presented for purposes of illustration and description and is not intended to be exhaustive or limited to the examples in the form disclosed. Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A virtual window for an aircraft, comprising:
   an interior wall of the aircraft;
   a hull mounted to the interior wall;
   a transparent lens secured between the hull and the interior wall;
   a touch sensing layer embedded within the transparent lens, the touch sensing layer operable from an interior of the aircraft; and
   a projector positioned between the transparent lens and the hull, the projector configured to display an image on the hull.

2. The virtual window of claim 1, further comprising a controller in a computer system of the aircraft, wherein the controller operates to provide the image to the projector.

3. The virtual window of claim 1, wherein the interior wall comprises a hole aligned with the transparent lens such that the image can be viewed through the hole and the transparent lens from an interior of the aircraft.

4. The virtual window of claim 1, further comprising a frame connected to the interior wall, the frame positioned between the interior wall and the hull.

5. The virtual window of claim 4, wherein the hull is connected to the frame.

6. The virtual window of claim 1, further comprising a base secured between the hull and the interior wall, the base connected to the transparent lens.

7. The virtual window of claim 1, wherein the projector is a first projector configured to project a first image on the hull, the virtual window further comprising a second projector configured to project a second image on the hull.

8. The virtual window of claim 7, wherein the first image is different from the second image.

9. The virtual window of claim 1, wherein the hull, the transparent lens, and the projector are assembled as a plug-and-play unit, the plug-and-play unit positioned between the interior wall of the aircraft and an exterior skin of the aircraft.

10. A projection based virtual window system of an aircraft, the system comprising:
    a hull mounted to an interior wall of a passenger cabin of the aircraft, the hull positioned over a hole in the interior wall;
    a transparent lens secured between the hull and the interior wall;
    a projection system configured to display an image on a projection surface of the hull;
    a controller operable to provide the image to the projection system; and
    a touch sensing layer embedded within the transparent lens, the touch sensing layer operable from the passenger cabin of the aircraft and in communication with the controller.

11. The system of claim 10, wherein the hole is aligned with the transparent lens such that the image can be viewed through the hole and the transparent lens from the passenger cabin of the aircraft.

12. The system of claim 10, further comprising a frame connected to the interior wall, wherein the hull is connected to the frame.

13. The system of claim 10, wherein the projection system comprises:
    a first projector configured to project a first image on the projection surface;

a second projector configured to project a second image on the projection surface; and a cable connecting the first projector to the second projector.

14. The system of claim 10, wherein the hull, the transparent lens, and the projection system are assembled as a plug-and-play unit mounted to an exterior surface of the interior wall.

15. A method for projecting a virtual window of an aircraft, the method comprising:

mounting a virtual window system to an interior wall of the aircraft, the virtual window system positioned over a hole in the interior wall, the virtual window system comprising:
- a transparent lens secured to a hull;
- a projection system connected to the hull and positioned between the transparent lens and the hull; and
- a touch sensing layer embedded within the transparent lens;

providing an image from a controller in a computer system of the aircraft to the projection system; and projecting the image on a projection surface of the hull, wherein the image is viewable through the hole in the interior wall and the transparent lens.

16. The method of claim 15, further comprising:

receiving input from the touch sensing layer to determine the image to provide to the projection system.

17. The method of claim 15, wherein the projection system comprises a first projector configured to project a first image on the projection surface and a second projector configured to project a second image on the projection surface, the method further comprising:

projecting the first image and the second image simultaneously.

18. The method of claim 15, further comprising:

changing the projected image based on input received from the touch sensing layer.

19. A virtual window for an aircraft, comprising:

an interior wall of the aircraft;

a hull mounted to the interior wall;

a transparent lens secured between the hull and the interior wall; and a projector positioned between the transparent lens and the hull, the projector configured to display an image on the hull;

wherein the interior wall comprises a hole aligned with the transparent lens such that the image can be viewed through the hole and the transparent lens from an interior of the aircraft.

20. A virtual window for an aircraft, comprising:

an interior wall of the aircraft;

a hull mounted to the interior wall;

a transparent lens secured between the hull and the interior wall;

a base secured between the hull and the interior wall, the base connected to the transparent lens; and a projector positioned between the transparent lens and the hull, the projector configured to display an image on the bull.

* * * * *